United States Patent
Grund et al.

(10) Patent No.: US 10,227,491 B2
(45) Date of Patent: Mar. 12, 2019

(54) FLUORESCENT REACTIVE DYES, PROCESS FOR THE PRODUCTION THEREOF AND THEIR USE

(71) Applicant: DyStar Colours Distribution GmbH, Raunheim (DE)

(72) Inventors: Clemens Grund, Hattersheim (DE); Yongnian Gao, Singapore (SG); Michael Sting-Rosen, Hürth (DE); Manfred Hoppe, Kürten (DE); Ulrich Hanxleden, Kelkheim (DE); Adrian Murgatroyd, Frankfurt (DE)

(73) Assignee: DyStar Coulors Distribution GmbH (DE)

(*) Notice: Subject to any disclaimer, the term of this patent is extended or adjusted under 35 U.S.C. 154(b) by 58 days.

(21) Appl. No.: 15/106,999

(22) PCT Filed: Apr. 8, 2015

(86) PCT No.: PCT/EP2015/057542
§ 371 (c)(1),
(2) Date: Jun. 21, 2016

(87) PCT Pub. No.: WO2015/158574
PCT Pub. Date: Oct. 22, 2015

(65) Prior Publication Data
US 2018/0194943 A1    Jul. 12, 2018

(30) Foreign Application Priority Data

Apr. 17, 2014 (EP) .................................. 14165125

(51) Int. Cl.
| C09B 11/24 | (2006.01) |
| C09B 62/02 | (2006.01) |
| C09B 62/04 | (2006.01) |
| C09B 62/44 | (2006.01) |
| C09B 62/503 | (2006.01) |
| C09D 11/037 | (2014.01) |
| D06P 3/60 | (2006.01) |

(52) U.S. Cl.
CPC ............ C09B 11/24 (2013.01); C09B 62/021 (2013.01); C09B 62/04 (2013.01); C09B 62/4403 (2013.01); C09B 62/4422 (2013.01); C09B 62/503 (2013.01); C09D 11/037 (2013.01); D06P 3/60 (2013.01)

(58) Field of Classification Search
CPC ....... C09B 11/24; C09B 62/021; C09B 62/04; C09B 62/4403; C09B 62/4422; C09B 62/503; C09D 11/037; D06P 3/60
See application file for complete search history.

(56) References Cited

U.S. PATENT DOCUMENTS

| 3,772,335 A | 11/1973 | Meininger et al. |
| 3,956,300 A | 5/1976 | Austin et al. |
| 5,279,656 A * | 1/1994 | Kenyon ............... C07D 311/82 106/31.43 |
| 6,843,838 B2 * | 1/2005 | Zimmer .............. C09B 67/0041 106/31.27 |
| 2006/0020141 A1 | 1/2006 | Banning et al. |

FOREIGN PATENT DOCUMENTS

| DE | 1955849 A1 | 5/1971 |
| DE | 2337488 B1 | 1/1975 |
| DE | 2442839 A1 | 3/1975 |
| EP | 0153480 A2 | 9/1985 |
| EP | 0330444 A2 | 8/1989 |
| GB | 1471453 A | 4/1977 |
| GB | 1503380 | * 3/1978 ............. C09B 57/00 |

OTHER PUBLICATIONS

International Search Report with Written Opinion of the International Searching Authority (in English) for PCT/EP2015/057542 dated Jun. 18, 2015.

* cited by examiner

*Primary Examiner* — Amina S Khan
(74) *Attorney, Agent, or Firm* — Drinker Biddle & Reath LLP

(57) ABSTRACT

The present invention is directed to fluorescent reactive dyes of general formula (I)

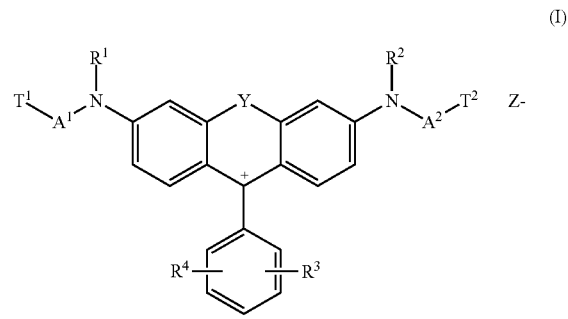

a process for the production thereof and their use.

18 Claims, No Drawings

FLUORESCENT REACTIVE DYES, PROCESS FOR THE PRODUCTION THEREOF AND THEIR USE

CROSS-REFERENCE TO RELATED APPLICATIONS

This application is a national stage application (under 35 U.S.C. § 371) of PCT/EP2015/057542, filed Apr. 8, 2015, which claims benefit of European Application No. 14165125.7, filed Apr. 17, 2014, both of which are incorporated herein by reference in their entirety.

The present invention relates to the technical field of reactive dyestuffs for dyeing and printing of hydroxyl-, amino- and/or carboxamido-containing material.

Fluorescent reactive dyes are known from prior art and can be used as colorants in different applications, see for example DE 2337488, EP 153480, DE 2442839 and DE 1955849.

However, in the context of the dyeing and printing of hydroxyl-, amino- and/or carboxamido-containing material the known dyes with fluorescence properties have a number of technical disadvantages such as unsatisfactory light fastness and especially limitations in built up and other dyeing properties especially in exhaust processes.

Surprisingly, it has now been found that the dyes of formula (I) as described below show highly advantageous properties over the known dyes. These dyes with two or more reactive anchors show good fluorescent properties also in combination/in mixtures with other fluorescent dyes and good overall fastness properties on the materials mentioned above and on blends containing them.

Some dye(s) of general formula (I)

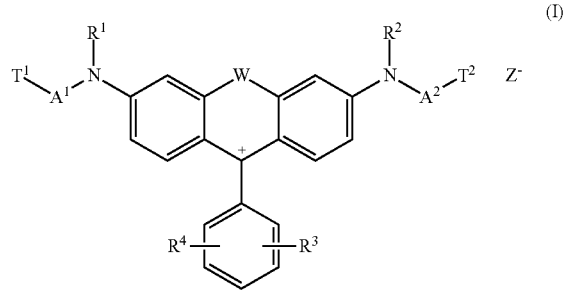

wherein in each case independent from each other
W is O, S or NH,
$R^1$ and $R^2$ is hydrogen, alkyl, alkyl substituted by one or more substituents selected from the group consisting of methoxy, hydroxy, sulfato, sulfo and chloro, aryl, aryl substituted by one or more substituents selected from the group consisting of chloro, acetylamino, sulfo, hydroxy, carboxy, ($C_1$-$C_4$)-alkanoyl, ($C_1$-$C_4$)-alkoxy and ($C_1$-$C_4$)-alkyl or benzyl,
$R^3$ and $R^4$ is hydrogen, alkyl, hydroxy, aryl, cycloalkyl, alkoxy, thioalkoxy, N-acylamino, N-cinnamoylamino, halogen, cyano, $SO_3M$, COOM, nitro, acyl, thioacyl, alkylsulfonyl, aryloyl, trifluoromethyl, heteroaryl, heterocycloalkyl, alkoxycarbonyl, alkoxythiocarbonyl, acyloxy, aryloyloxy or $SO_2$—X,
 wherein X is vinyl or $CH_2CH_2$—Y,
  wherein Y is a group removable under alkaline conditions,
$Z^-$ is an anion,
$A^1$ and $A^2$ is a spacer and
$T^1$ and $T^2$ is a reactive anchor
have such advantageous technical properties.

The chromophore in this invention is a group having the following structure:

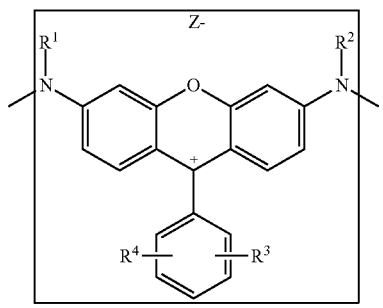

Attached to it are the spacers $A^1$ and $A^2$.

A group removable under alkaline conditions, is a group which will leave the molecule under alkaline conditions to yield a vinyl sulfone. Non-limiting examples of such groups are $OSO_3M$, $SSO_3M$, $OCOCH_3$, $OPO_3M$ and halogen.

The anion is defined by the production and/or purification process. Non-limiting examples of anions are halogen, sulfates, benzolsulfonates, toluolsulfonates, tetraborofluorates or acetates. Preferred are chloride, bromide and sulfates.

A spacer is a group that can react on one side with the chromophore/chromophore precursor and with a second reaction center of the molecule with a reactive anchor. A spacer can be aliphatic-, aromatic- or mixed aliphatic/aromatic. Non-limiting examples are substituted- or unsubstituted-alkylen-diamines for aliphatic-spacers, substituted- or unsubstituted-aniline-/naphthaline-diamines for aromatic-spacers and aminoalkyl substituted anilines-/naphthalines- for mixed aliphatic/aromatic-spacers.

A reactive anchor is a group that is directly fixed with a covalent bond to the chromophor or via a spacer that can form a covalent bond to hydroxyl-, amino- and/or carboxamido-containing fibre. This can be achieved with groups having activated leaving groups, such as halogen or $OSO_3H$, which can be replaced in a nucleophilic substitution reaction by the hydroxyl-, amino- and/or carboxamido-containing fibre. Non-limiting examples are: β-chloroethylsulfonyl-groups, 2,3-dibromo-propionic acid derivatives (CO—CHBr—$CH_2$Br) and β-sulfatoethylsulfonyl groups and 2,3-dichloro-quinoxaline.

A second reaction type to form a covalent bond to hydroxyl-, amino- and/or carboxamido-containing material is the nucleophilic addition to an activated carbon-carbon double bond by the hydroxyl-, amino-groups of the fibre.

Non-limiting examples are: bromo-acrylic (CO—CBr=$CH_2$)-acid derivatives and vinylsulfones ($SO_2$—CH=$CH_2$).

The invention is directed to a dye of formula (I)

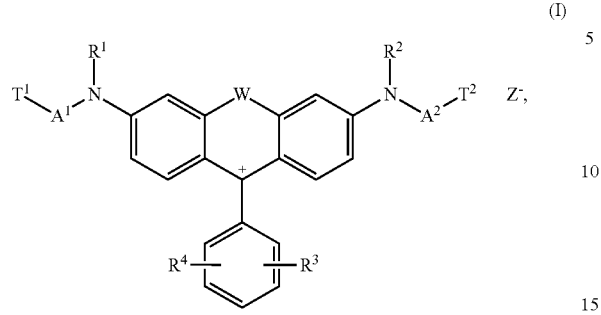

wherein in each case independent from each other

W is O, S or NH,

R¹ and R² is hydrogen, alkyl, alkyl substituted by one or more substituents selected from the group consisting of methoxy, hydroxy, sulfato, sulfo and chloro, aryl, aryl substituted by one or more substituents selected from the group consisting of chloro, acetylamino, sulfo, hydroxy, carboxy, ($C_1$-$C_4$)-alkanoyl, ($C_1$-$C_4$-alkoxy and ($C_1$-$C_4$-alkyl or benzyl, R³ and R⁴ is hydrogen, alkyl, hydroxy, aryl, cycloalkyl, alkoxy, thioalkoxy, N-acylamino, N-cinnamoylamino, halogen, cyano, $SO_3M$, COOM, nitro, acyl, thioacyl, alkylsulfonyl, aryloyl, trifluoromethyl, heteroaryl, heterocycloalkyl, alkoxycarbonyl, alkoxythiocarbonyl, acyloxy, aryloyloxy or $SO_2$—X, wherein X is vinyl or $CH_2CH_2$—Y, wherein Y is a group removable under alkaline conditions, Z⁻ is selected from the group consisting of halogen, sulfate, alkylsulfonate, benzolsulfonate, toluolsulfonate, tetraborofluorate and acetate, A¹ and A² is a spacer of formula (2c) or (2d)

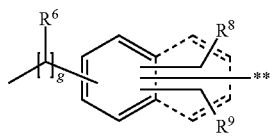

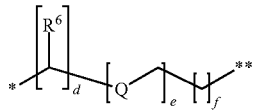

whereby the respective spacer A¹/A² is attached to the chromophore at the * position and to the respective reactive anchor T¹/T² at the ** position, and wherein d is an integer from 1 to 4, e is an integer from 0 to 3, f is an integer from 0 to 3, g is an integer from 0 to 3, Q is O, NH or S, R⁶ is hydrogen, halogen, alkyl, N-acylamino, alkoxy, thioalkoxy, hydroxy, alkoxycarbonyl, acyl, arylol, acyloxy, aryloyloxy, cycloalkyl, aryl, $SO_3M$ or COOM, R⁸ and R⁹ is hydrogen, alkyl, alkoxy, aryl, hydroxyl, NH—$CH_2$—$CH_2$—$OSO_3H$, $SO_3M$ or COOM, T¹ and T² is a reactive anchor of formula (3d), (3e) or $SO_2$—X

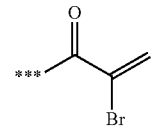

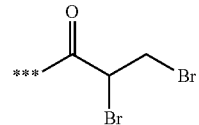

whereby the respective reactive anchor T¹/T² is attached to the respective spacer A¹/A² at the *** position, and wherein X is vinyl or $CH_2CH_2$—Y, wherein Y is a group removable under alkaline conditions, and M is hydrogen, lithium, sodium, potassium, ammonium, mono-, di-, tri- or tetra-($C_1$-$C_4$)-alkylammonium, one equivalent of an alkali earth metal or a monovalent organic cation.

This invention refers to all kinds of tautomeric and geometric isomers of the dyes of the formula (I).

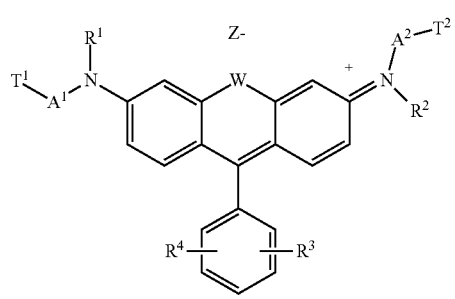
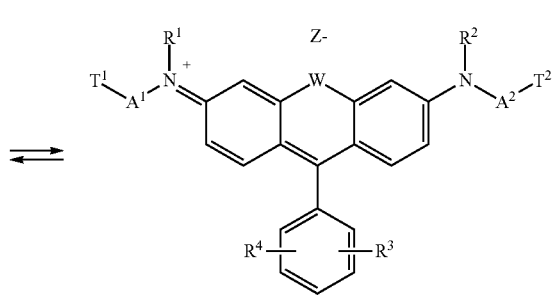

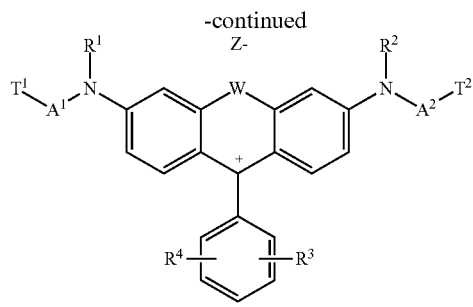

Alkyl groups in this invention may be straight-chain or branched and are ($C_1$-$C_{12}$)-alkyl groups, preferably ($C_1$-$C_8$)-alkyl groups, for example n-butyl, isobutyl, n-pentyl, isopentyl, n-hexyl, 2-ethylhexyl, sec-butyl, tert-butyl and methylbutyl.

The same applies for alkoxy groups, which accordingly are preferably ($C_1$-$C_8$)-alkoxy, for example methoxy and ethoxy, to thioalkoxy groups, which are preferably ($C_1$-$C_8$)-thioalkoxy, for example —$SCH_3$ and —$SC_2H_5$.

Cycloalkyl groups are preferably ($C_3$-$C_8$)-cycloalkyl. Particularly preferred are cyclopentyl and cyclohexyl. The term cyloalkyl comprises for the purpose of the present invention substituted cycloalklyl groups and unsaturated cycloalkyl groups as well. A preferred group of this type is cyclopentenyl. Preferred substituents are alkyl, hydroxyalkyl, halogen, hydroxyl, alkoxy, acyl, cyano, nitro, amino, monoalkylamino, dialkylamino, mono(hydroxyalkyl)amino, bis-(hydroxyalkyl)amino, monoalkyl-mono(hydroxyalkyl) amino, carbamoyl, sulfamoyl, acylamino, ureido, aminosulfonylamino, alkoxycarbonyl and acyloxy.

Aryl groups appearing in this invention are preferably phenyl or naphthyl. The terms phenyl and naphthyl comprise unsubstituted as well as substituted phenyl and naphthyl. Preferred substituents are alkyl, cycloalkyl, heterocycloalkyl, hydroxyalkyl, halogen, hydroxyl, alkoxy, alkylthio, acyl, nitro, cyano, amino, monoalkylamino, dialkylamino, mono(hydroxyalkyl)amino, bis-(hydroxyalkyl) amino, monoalkyl-mono-(hydroxyalkyl)amino, carbamoyl, sulfamoyl, acylamino, ureido, aminosulfonylamino, alkoxycarbonyl and acyloxy.

Heteroaryl groups appearing in this invention are preferably pyridine, pyrimidine, pyridazine, pyrazine, pyrrole, imidazole, pyrazole, 1,2,4-thiadiazole, 1,2,4-triazole, tetrazole, thiophene, thiazole, isothiazole, benzothiazole, benzoisothiazole, 1,3,4-thiadiazole, furane, oxazole, benzoxazole or isoxazole. The term heteroaryl comprises the above groups in unsubstituted as well as in substituted form. Preferred substituents are alkyl, hydroxyalkyl, halogen, hydroxyl, alkoxy, alkylthio, acyl, nitro, cyano, amino, monoalkylamino, dialkylamino, mono(hydroxyalkyl)amino, bis-(hydroxyalkyl)amino, monoalkyl-mono(hydroxyalkyl) amino, carbamoyl, sulfamoyl, acylamino, ureido, aminosulfonylamino, alkoxycarbonyl and acyloxy.

Heterocycloalkyl groups are preferably pyrrolidine, piperidine, morpholine, tetrahydrofuran or piperazine. The term heterocycloalkyl comprises the above groups in unsubstituted as well as in substituted form. Preferred substituents are alkyl, hydroxyalkyl, halogen, hydroxyl, alkoxy, alkylthio, acyl, nitro, cyano, amino, monoalkylamino, dialkylamino, mono(hydroxyalkyl)amino, bis-(hydroxylalkyl) amino, monoalkyl-mono(hydroxyalkyl)amino, carbamoyl, sulfamoyl, acylamino, aminocarbonylamino, aminosulfonylamino, alkoxycarbonyl and acyloxy.

Halogen is preferably chlorine, bromine or fluorine.

M is preferably hydrogen, lithium, sodium or potassium.

There exist preferred embodiments of the invention. The first preferred embodiment is characterized by the fact that both reactive anchors $T^1$ and $T^2$ are vinylsulfone- ($SO_2$—$CH$=$CH_2$) and/or β-سulfatoethylsulfonyl- groups ($SO_2$—$CH_2$—$CH_2$—$OSO_3H$).

More preferred is a dye as described above, wherein in each case independent from each other W is O or S, $R^1$ and $R^2$ is hydrogen, alkyl, alkyl substituted by one or more substituents selected from the group consisting of methoxy, hydroxy, sulfato, sulfo and chloro, aryl, aryl substituted by one or more substituents selected from the group consisting of chloro, acetylamino, sulfo, hydroxy, carboxy, ($C_1$-$C_2$)-alkanoyl, ($C_1$-$C_2$)-alkoxy and ($C_1$-$C_2$)-alkyl or benzyl, $R^3$ and $R^4$ is hydrogen, ($C_1$-$C_4$)-alkyl, hydroxy, aryl, ($C_1$-$C_4$)-alkoxy, N-acylamino, halogen, $SO_3M$, COOM, acyl, ($C_1$-$C_4$)-alkylsulfonyl, ($C_1$-$C_4$)-alkoxycarbonyl or $SO_2$—X, wherein X is vinyl or $CH_2CH_2$—Y, wherein Y is a group removable under alkaline conditions, $Z^-$ is selected from the group consisting of halogen, sulfate, alkylsulfonate, benzolsulfonate, toluolsulfonate, tetraborofluorate and acetate, $A^1$ and $A^2$ is a spacer of formula (2c) or (2d)

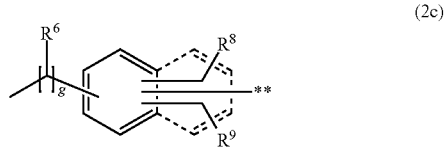

(2c)

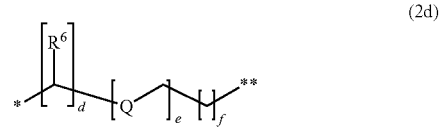

(2d)

whereby the respective spacer $A^1$/$A^2$ is attached to the chromophore at the * position and to the respective reactive anchor $T^1$/$T^2$ at the ** position, and wherein d is 1 or 2, e is 0 or 1, f is 0 g is 0 or 1,

Q is O or S, $R^6$ is hydrogen, ($C_1$-$C_4$)-alkyl, N-acylamino, ($C_1$-$C_4$)-alkoxy, acyl, benzyl, $SO_3M$ or COOM $R^8$ and $R^9$ is hydrogen, ($C_1$-$C_4$)-alkyl, ($C_1$-$C_4$)-alkoxy, $SO_3M$ or $COOM$, $T^1$ and $T^2$ is $SO_2$—X,
wherein X is vinyl or $CH_2CH_2$—Y,
wherein Y is a group removable under alkaline conditions
and
M is hydrogen, lithium, sodium, potassium, one equivalent of an alkali earth metal or a monovalent organic cation.

And most preferred is a dye as described above, wherein in each case independent from each other
W is oxygen,
$R^1$ and $R^2$ is hydrogen, ($C_1$-$C_4$)-alkyl, aryl or benzyl,
$R^3$ and $R^4$ is hydrogen, ($C_1$-$C_2$)-alkyl, halogen, $SO_3M$, $COOM$ or $SO_2$—X,
wherein X is vinyl or $CH_2CH_2$—Y,
wherein Y is a group removable under alkaline conditions,
$Z^-$ is selected from the group consisting of halogen, sulfate, alkylsulfonate, benzolsulfonate, toluolsulfonate, tetraborofluorate and acetate,
$A^1$ and $A^2$ is a spacer of formula (2c-1) or (2d-1)

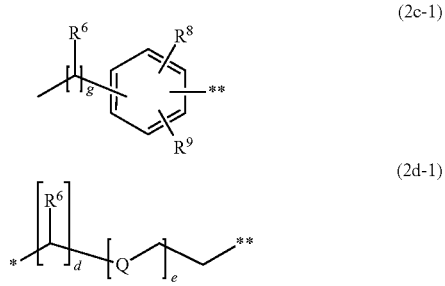

whereby the respective spacer $A^1/A^2$ is attached to the chromophore at the * position and to the respective reactive anchor $T^1/T^2$ at the ** position, and wherein
d is 1 or 2,
e is 0 or 1,
g is 0 or 1,
Q is oxygen,
$R^6$ is hydrogen or ($C_1$-$C_2$)-alkyl,
$R^8$ and $R^9$ is hydrogen, ($C_1$-$C_2$)-alkyl, ($C_1$-$C_2$)-alkoxy or $SO_3M$,
$T^1$ and $T^2$ is $SO_2$—X,
wherein X is vinyl or $CH_2CH_2$—Y,
wherein Y is a group removable under alkaline conditions
and
M is hydrogen, lithium, sodium, potassium, one equivalent of an alkali earth metal or a monovalent organic cation.

The dyes of the present invention can be produced in different ways. Thus the invention is also directed to two processes for the production of the inventive dyes.

A process for the production of dyes as described above comprising the steps of:
a) Reacting one 3,6,9 substituted 9H-Xanthene, wherein the 3- and 6-substituents react as a leaving group, with two precursor-amines H—$NR^1$-$A^1$-$T^1$ and H—$NR^2$-$A^2$-$T^2$ of identical or different spacer-reactive-anchor-units on 3- and 6-position, b) Sulfonating the OH-groups with concentrated sulfuric acid thus forms an aspect of the present invention.

And a process for the production of dyes as described above comprising the steps of:
reacting
one 3,6,9 substituted 9H-Xanthene, wherein the 3- and 6-substituents react as a leaving group, with
a) two identical aliphatic-, aromatic- or mixed aliphatic/aromatic-amines symmetrically on both 3- and 6-position,
or
b) one aliphatic-, aromatic- or mixed aliphatic/aromatic-amine for the 3-position in a first step
and
one aliphatic-, aromatic- or mixed aliphatic/aromatic-amine, which is different to the first one, for the 6-position in a second step
or
c) one aliphatic-, aromatic- or mixed aliphatic/aromatic-amine for the 6-position in a first step
and
one aliphatic-, aromatic- or mixed aliphatic/aromatic-amine, which is different to the first one, for the 3-position in a second step
and further reacting the products resulting from a), b) or c) respectively with reactive anchor groups
forms another aspect of the present invention.

The compounds, which lead to the sections of the dye-molecule having formula (2c), (2c-1), (2d), (2d-1), (3d) and (3e) are known and commercially available or can be synthesised by means of common chemical reactions known to a person skilled in the art (see e.g. Ullmanns Encyclopedia of Industrial Chemistry; Houben-Weil, Methods of Organic Chemistry).

The end product, which contains β-sulfatoethylsulfonyl-groups can optionally also be subjected to a vinylization reaction. For example, a vinylizable reaction group such as β-sulfatoethylsulfonyl is converted into its vinyl form. Such reactions are known to a person skilled in the art. They are generally performed in a neutral to alkaline medium at a temperature, for example, from 20 to 80° C., at a pH of, for example, from 7 to 10.

The dyes of formula (I) are fiber-reactive, i.e. are containing fiber-reactive functional rests. Fiber-reactive functional rests refer to rests capable of reacting with the hydroxyl groups of cellulosic materials, the amino, carboxyl, hydroxyl and thiol groups in the case of wool and silk, or with the amino and possibly carboxyl groups of synthetic polyamides to form covalent chemical bonds.

The dyes of the present invention are suitable for dyeing and printing of natural, manufactured, regenerated, mechanically or chemically modified, recycled or synthetic hydroxyl-, amino-, and/or carboxamido-containing fiber materials and their blends by the application methods numerously described in the art for reactive dyes.

Thus a process for dyeing or printing carboxamido- and/or hydroxyl-containing material, comprising contacting the carboxamido- and/or hydroxyl-containing material with a dye as described above forms another aspect of the present invention.

Examples of natural fibre materials as described above are vegetable fibres such as seed fibres i.e. cotton, organic cotton, kapok, coir from coconut husk; bast fibers i.e. flax, hemp, jute, kenaf, ramie, rattan; leaf fibres i.e. sisal, henequen, banana; stalk fibres i.e. bamboo; and fibres from animals such as wool, organic wool, silk, cashmere wool, alpaca fiber, mohair, Angora fibre as well as fur and leather materials.

Examples of manufactured and regenerated fibres are cellulosic fibres such as paper and cellulosic regenerated fibres such as viscose rayon fibres, acetate and triacetate fibers and Lyocell fibers.

Examples of synthetic fiber materials as described above are nylon materials, like nylon-6, nylon-6.6 and aramid fibres.

The above-mentioned substrates to be dyed can be present in various forms such as but not limited to yarn, woven fabric, loop-formingly knitted fabric or carpet.

Fiber and blends containing such fiber selected from the group consisting of: synthetic fiber materials, nylon materials, nylon-6, nylon-6.6 and aramid fibres, vegetable fibres, seed fibres, cotton, organic cotton, kapok, coir from coconut husk; bast fibers, flax, hemp, jute, kenaf, ramie, rattan; leaf fibres, sisal, henequen, banana; stalk fibres, bamboo; fibres from animals, wool, organic wool, silk, cashmere wool, alpaca fiber, mohair, Angora fibre as well as fur and leather materials; manufactured, regenerated and recycled fibres, cellulosic fibres; paper fibres, cellulosic regenerated fibres, viscose rayon fibres, acetate and triacetate fibers, and Lyocell fibers comprising one or more dye(s) as described above either in chemically and/or physically bound form thus forms another aspect of the present invention.

The dyes of the present invention and their salts or mixtures can be used as a single dyeing product in dyeing or printing processes or it can be part of a di/tri or multicomponent combination product in dyeing or in printing compositions.

The use of a dye as described above, a chemical composition or of an aqueous solution as described below for dying fibers, as well as blends of such fibres selected from the group consisting of; synthetic fiber materials, nylon materials, nylon-6, nylon-6.6 and aramid fibres, vegetable fibres, seed fibres, cotton, organic cotton, kapok, coir from coconut husk; bast fibers, flax, hemp, jute, kenaf, ramie, rattan; leaf fibres, sisal, henequen, banana; stalk fibres, bamboo; fibres from animals, wool, organic wool, silk, cashmere wool, alpaca fiber, mohair, Angora fibre as well as fur and leather materials; manufactured, regenerated and recycled fibres, cellulosic fibres; paper fibres, cellulosic regenerated fibres, viscose rayon fibres, acetate and triacetate fibers and Lyocell fibers is another aspect of the present invention.

Dyes of this invention and their salts or mixtures are highly compatible with other known and/or commercially available dyes and they can be used together with such dyes to obtain specific hues of similarly good technical performance, Technical performance includes build-up, fastness properties and levelness.

A chemical composition comprising one or more dye(s) of the present invention forms yet another aspect of the present invention.

Since the water solubility of the dyes according to the invention is very good, they can also be used with advantage in customary continuous dyeing processes.

The dyes of the present invention can also be used in digital printing processes, in particular in digital textile printing. An aqueous solution for dying comprising one or more chemical compounds as described above forms still another aspect of the present invention.

As does an ink for digital textile printing, comprising a dye of the present invention.

The inks of the present invention comprise the dye of the present invention in amounts which preferably range from 0.1% by weight to 50% by weight, more preferably from 1% by weight to 30% by weight and most preferably from 1% by weight to 15% by weight, based on the total weight of the ink.

The inks, as well as the dyes of the present invention may, if desired, contain further dyes used in digital printing.

For the inks of the present invention to be used in the continuous flow process, a conductivity of 0.5 to 25 mS/m can be set by adding an electrolyte. Useful electrolytes include for example lithium nitrate and potassium nitrate. The inks of the present invention may include organic solvents at a total level of 1-50% and preferably 5-30% by weight. Suitable organic solvents are for example alcohols, for example methanol, ethanol, 1-propanol, isopropanol, 1-butanol, tert-butanol, pentyl alcohol, polyhydric alcohols for example: 1,2-ethanediol, 1,2,3-propanetriol, butanediol, 1,3-butanediol, 1,4-butanediol, 1,2-propanediol, 2,3-propanediol, pentanediol, 1,4-pentanediol, 1,5-pentanediol, hexanediol, D,L-1,2-hexanediol, 1,6-hexanediol, 1,2,6-hexanetriol, 1,2-octanediol, polyalkylene glycols, for example: polyethylene glycol, polypropylene glycol, alkylene glycols having 1 to 8 alkylene groups, for example: monoethylene glycol, diethylene glycol, triethylene glycol, tetraethylene glycol, thioglycol, thiodiglycol, butyltriglycol, hexylene glycol, propylene glycol, dipropylene glycol, tripropylene glycol, low alkyl ethers of polyhydric alcohols, for example: ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, diethylene glycol monohexyl ether, triethylene glycol monomethyl ether, triethylene glycol monobutyl ether, tripropylene glycol monomethyl ether, tetraethylene glycol monomethyl ether, tetraethylene glycol monobutyl ether, tetraethylene glycol dimethyl ether, propylene glycol monomethyl ether, propylene glycol monoethyl ether, propylene glycol monobutyl ether, tripropylene glycol isopropyl ether, polyalkylene glycol ethers, such as for example: polyethylene glycol monomethyl ether, polypropylene glycol glycerol ether, polyethylene glycol tridecyl ether, polyethylene glycol nonylphenyl ether, amines, such as for example: methylamine, ethylamine, triethylamine, diethylamine, dimethylamine, trimethylamine, dibutylamine, diethanolamine, triethanolamine, N-acetylethanolamine, N-formylethanolamine, ethylenediamine, urea derivatives, such as for example: urea, thiourea, N-methylurea, N,N'-epsilon dimethylurea, ethyleneurea, 1,1,3,3-tetramethylurea, amides, such as for example: dimethylformamide, dimethylacetamide, acetamide, ketones or keto alcohols, such as for example: acetone, diacetone alcohol, cyclic ethers, such as for example: tetrahydrofuran, trimethylolethane, trimethylolpropane, 2-butoxyethanol, benzyl alcohol, 2-butoxyethanol, gamma butyrolactone, epsilon-caprolactam, further sulfolane, dimethylsulfolane, methylsulfolane, 2,4-dimethylsulfolane, dimethyl sulfone, butadiene sulfone, dimethyl sulfoxide, dibutyl sulfoxide, N-cyclohexylpyrrolidone, N-methyl-2-pyrrolidone, M-ethylpyrrolidone, 2-pyrrolidone, 1-(2-hydroxyethyl)-2-pyrrolidone, 1-(3-hydroxypropyl)-2-pyrrolidone, 1,3-dimethyl-2-imidazolidinone, 1,3-dimethyl-2-imidazolinone, 1,3- bismethoxymethylimidazolidine, 2-(2-methoxyethoxy)ethanol, 2-(2-ethoxyethoxy)ethanol, 2-(2-butoxyethoxy)ethanol, 2-(2-propoxyethoxy)ethanol, pyridine, piperidine, butyrolactone, trimethylpropane, 1,2-dimethoxypropane, dioxane ethyl acetate, ethylenediaminetetraacetate ethyl pentyl ether, 1,2-dimethoxypropane and trimethylpropane.

The inks of the invention may further include customary additives, for example viscosity moderators to set viscosities in the range from 1.5 to 40.0 mPas in a temperature range from 20 to 50° C. Preferred inks have a viscosity of 1.5 to 20 mPas and particularly preferred inks have a viscosity of 1.5 to 15 mPas.

Useful viscosity moderators include rheological additives, for example: polyvinylcaprolactam, polyvinylpyrrolidone and their copolymers polyetherpolyol, associative thickeners, polyurethane, polyurethane, sodium alginates, modified galactomannans, polyetherurea, polyurethane, nonionic cellulose ethers.

As further additives the inks of the invention may include surface-active substances to set surface tensions of 20 to 65 mN/m, which are adapted if necessary as a function of the process used (thermal or piezo technology). Useful surface-active substances include for example all surfactants, preferably nonionic surfactants, butyldiglycol and 1,2-hexanediol.

The inks of the present invention may further include customary additives, for example substances to inhibit fungal and bacterial growth in amounts from 0.01 to 1% by weight based on the total weight of the ink.

The inks may be prepared in a conventional manner by mixing the components in water.

The inks of the present invention are particularly useful in inkjet printing processes for printing a wide variety of materials, in particular of wool and polyamide fibers.

The examples below serve to illustrate the invention. Parts and percentages are by weight unless noted otherwise.

The relationship between parts by weight and parts by volume is that of the kilogram to the liter.

EXAMPLE 1

50 parts of 2-sulfobenzoic acid anhydride were added to 246 parts of POCl₃ under stirring. After 30 minutes 58 parts of resorcinol (3-hydroxy-phenol) were added and the mixture was heated to 95° C. and stirred for 2 hours. The reaction mixture was cooled down to 5° C. and added to 3000 parts of a 5° C. cold 20% ic aqueous NaCl solution. The suspension was stirred for 30 minutes at 0 to 5° C. and filtrated. The isolated wet press paste was suspended in 200 parts of acetone and stirred for 20 minutes at 5° C. After filtration and drying 27 parts of dichloro-sulfophenyl-xanthen were isolated.

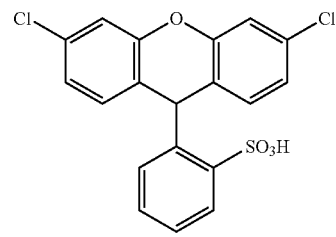

Dichloro-sulfophenyl-xanthen

1. Condensation: 10.13 parts of dichloro-sulfophenyl-xanthen were mixed together with 5.73 parts of n-ethyl-3 (β-hydroxyethy)sulfonyl anilin/(2-(3-ethylamino-benzene-sulfonyl)-ethanol) as amine 1 in 100 ml of water and the pH was adjusted to 5.0. The reaction mixture was heated to 60° C. and stirred and the pH was kept at 5.0 with a 15% ic Na₂CO₃ solution.

2. Condensation: After 1 hour 4.9 parts of 2-(2-methyl-amino-ethanesulfonyl)-ethanol as amine 2 were added and the pH was adjusted to 9.0 and the reaction mixture was heated to 90° C. and stirred for 3 hours.

The reaction mix was cooled to room temperature and the water was evaporated under reduced pressure delivering 20.5 parts of Intermediate 1 after drying under vacuum conditions.

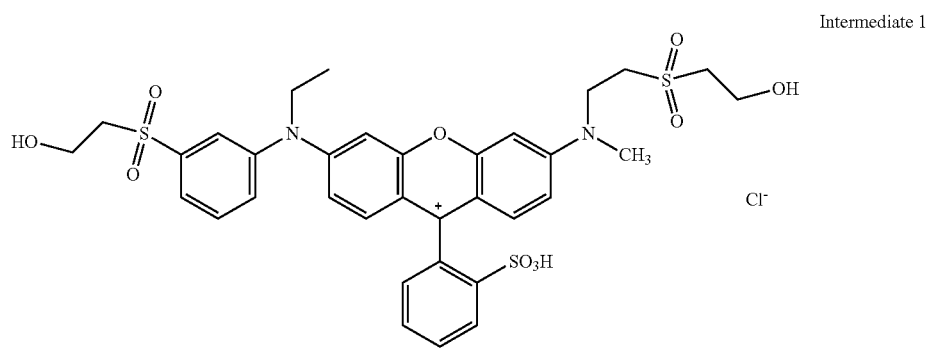 [SMILES: CCN(c1cccc(S(=O)(=O)CCO)c1)c1ccc2c(c1)oc1cc(N(C)CCS(=O)(=O)CCO)ccc1[c+]2-c1ccccc1S(=O)(=O)O ; [Cl-]]

Intermediate 1

Sulfonation: 17.52 parts of Intermediate 1 were added in portions to 110 parts sulfuric acid (98 to 100%) at 20 to 60° C. The reaction mixture was stirred for 3 h at 60° C. and then cooled to 0 to 5° C. This mixture was added to 300 parts of ice at 0° C., the pH was adjusted with CaCO₃ to 5.3. The CaSO₄ was filtered and the product in the filtrated solution was isolated by vacuum rotary evaporation and dried under vacuum conditions resulting in 16 parts of example 1 that dyes cotton in brilliant fluorescent red shades.

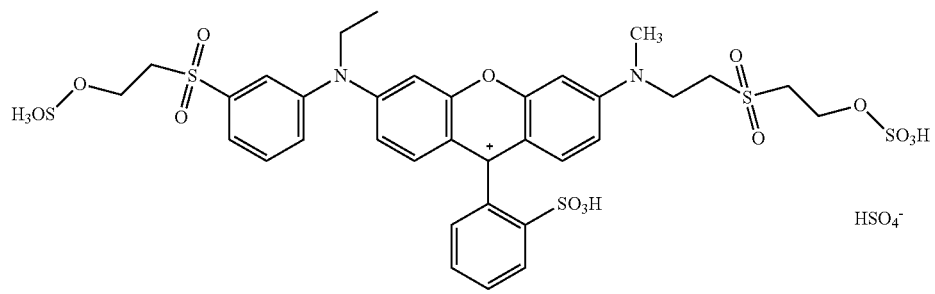

EXAMPLE 1

Example 2:
1. Condensation: 10.13 parts of Dichloro-sulfophenyl-xanthen were mixed together with 5.73 parts of n-ethyl-3 (β-hydroxyethy)sulfonyl anilin 2-(3-ethylamino-benzene-sulfonyl)-ethanol as amine 1 in 100 ml of water and the pH was adjusted to 5.0. The reaction mixture was heated to 60° C. and stirred and the pH was kept at 5.0 with a 15% ic Na$_2$CO$_3$ solution.

2. Condensation: After 1 hour 4.9 parts 2-(2-chloro-ethanesulfonyl)-ethylamine as amine 2 were added and the pH was adjusted to 9.0 and the reaction mixture was heated to 90° C. and stirred for 3 hours.

The reaction mix was cooled to room temperature and the water was evaporated under reduced pressure delivering 20.5 parts of Intermediate 1 after drying under vacuum conditions.

Intermediate 1a

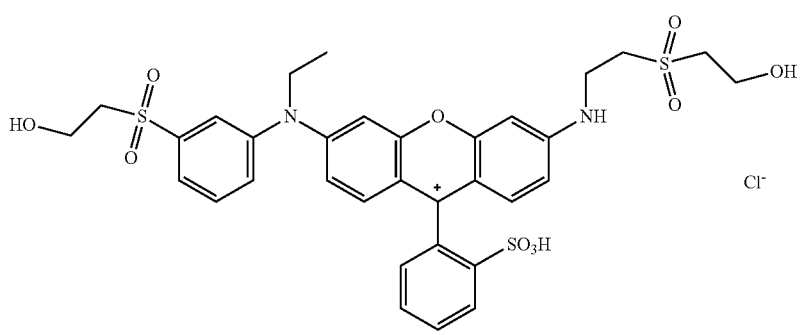

Sulfonation: 17.52 parts of Intermediate 1 were added in portions to 110 parts sulfuric acid (98 to 100%) at 20 to 60° C. The reaction mixture was stirred for 3 h at 60° C. and then cooled to 0 to 5° C. This mixture was added to 300 parts of ice at 0° C., the pH was adjusted with CaCO$_3$ to 5.3. The CaSO$_4$ was filtered and the product in the filtrated solution was isolated by vacuum rotary evaporation and dried under vacuum conditions resulting in 16 parts of example 1 that dyes cotton in brilliant fluorescent red shades.

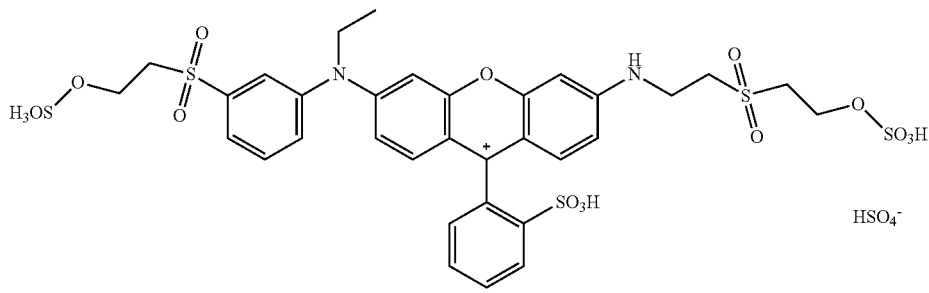

EXAMPLE 2

Example 3 to 39

According to example 1 or 2 the following amines can be used for 1. Condensation (Amine 1) and for 2. Condensation (Amine 2). After sulfonation and isolation according to example 1 or 2 dyes having the given colours are obtained when using amines 1 and 2 as indicated.

| Amine 1 | Amine 2 | Example | Shade on cotton |
|---------|---------|---------|-----------------|
| HO-CH₂CH₂-SO₂-C₆H₄-NH₂ (para) | HO-CH₂CH₂-SO₂-CH₂CH₂-NH(CH₃) | 3 | Red |
| HO-CH₂CH₂-SO₂-C₆H₄-NH₂ (para) | Cl-CH₂CH₂-SO₂-CH₂CH₂-NH₂ | 4 | Red |
| HO-CH₂CH₂-SO₂-C₆H₄-NH₂ (para) | Cl-CH₂CH₂-SO₂-CH₂CH₂-O-CH₂CH₂-NH₂ | 5 | Red |
| HO-CH₂CH₂-SO₂-C₆H₄-NH₂ (para) | HO-CH₂CH₂-SO₂-CH₂CH₂-NH-C₆H₅ | 6 | Red |
| HO-CH₂CH₂-SO₂-C₆H₄-NH₂ (meta) | HO-CH₂CH₂-SO₂-CH₂CH₂-NH(CH₃) | 7 | Red |
| HO-CH₂CH₂-SO₂-C₆H₄-NH₂ (meta) | Cl-CH₂CH₂-SO₂-CH₂CH₂-NH₂ | 8 | Red |
| HO-CH₂CH₂-SO₂-C₆H₄-NH₂ (meta) | Cl-CH₂CH₂-SO₂-CH₂CH₂-O-CH₂CH₂-NH₂ | 9 | Red |
| HO-CH₂CH₂-SO₂-C₆H₄-NH₂ (meta) | HO-CH₂CH₂-SO₂-CH₂CH₂-NH-C₆H₅ | 10 | Red |
| HO-CH₂CH₂-SO₂-C₆H₄-NH-C₂H₅ (meta) | Cl-CH₂CH₂-SO₂-CH₂CH₂-O-CH₂CH₂-NH₂ | 11 | Bluish red |

-continued
| Amine 1 | Amine 2 | Example | Shade on cotton |
|---|---|---|---|
| 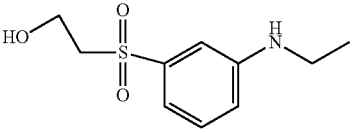 | 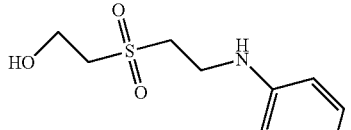 | 12 | Bluish red |
| 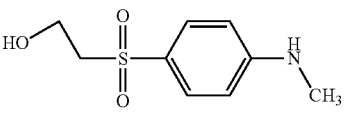 | 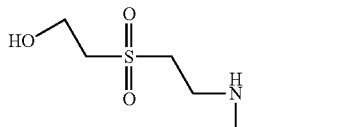 | 13 | Bluish red |
| 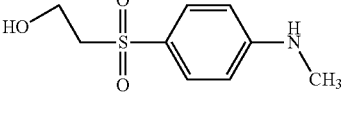 | 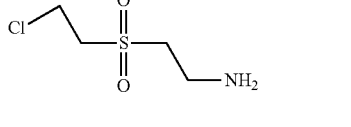 | 14 | Bluish red |
| 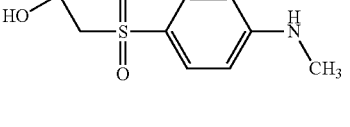 | 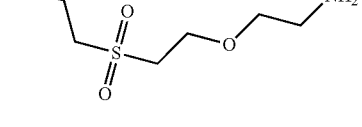 | 15 | Bluish red |
| 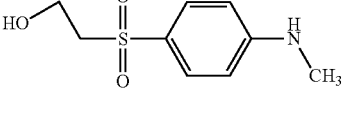 | 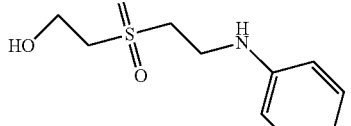 | 16 | Bluish red |
| 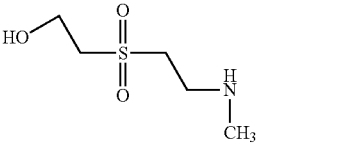 | 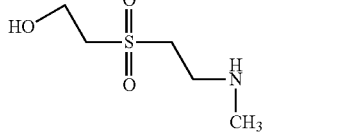 | 17 | Bluish red |
| 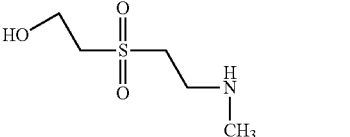 | 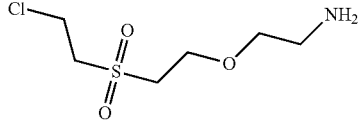 [SMILES: NCCOCCS(=O)(=O)CCCl] | 18 | Bluish red |
| 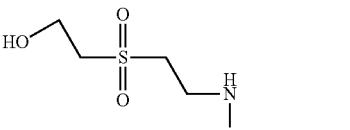 | 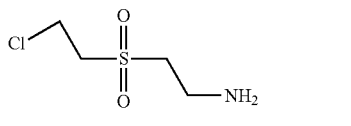 | 19 | Bluish red |
| 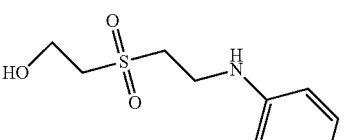 | 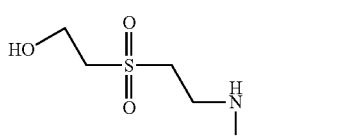 | 20 | Bluish red |

-continued

| Amine 1 | Amine 2 | Example | Shade on cotton |
|---|---|---|---|
| HO-CH2CH2-SO2-CH2CH2-NH-C6H5 | Cl-CH2CH2-SO2-CH2CH2-O-CH2CH2-NH2 | 21 | Bluish red |
| HO-CH2CH2-SO2-CH2CH2-NH-C6H5 | Cl-CH2CH2-SO2-CH2CH2-NH2 | 22 | Bluish red |
| HO-CH2CH2-SO2-CH2CH2-NH-C6H5 | HO-CH2CH2-SO2-CH2CH2-NH-C6H5 | 23 | Bluish red |
| 2-amino-5-(2-hydroxyethylsulfonyl)benzenesulfonic acid | HO-CH2CH2-SO2-CH2CH2-NH-CH3 | 24 | Red |
| 2-amino-5-(2-hydroxyethylsulfonyl)benzenesulfonic acid | Cl-CH2CH2-SO2-CH2CH2-O-CH2CH2-NH2 | 25 | Red |
| 2-amino-5-(2-hydroxyethylsulfonyl)benzenesulfonic acid | Cl-CH2CH2-SO2-CH2CH2-NH2 | 26 | Red |
| 2-amino-5-(2-hydroxyethylsulfonyl)benzenesulfonic acid | HO-CH2CH2-SO2-CH2CH2-NH-C6H5 | 27 | Red |
| 2-amino-4,5-dimethoxy-(2-hydroxyethylsulfonyl)benzene | HO-CH2CH2-SO2-CH2CH2-NH-CH3 | 28 | Violet |
| 2-amino-4,5-dimethoxy-(2-hydroxyethylsulfonyl)benzene | Cl-CH2CH2-SO2-CH2CH2-O-CH2CH2-NH2 | 29 | Violet |

-continued
| Amine 1 | Amine 2 | Example | Shade on cotton |
|---|---|---|---|
| 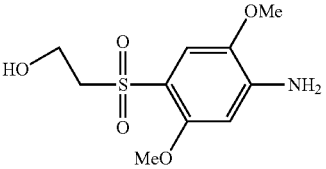 [SMILES: COc1cc(S(=O)(=O)CCO)c(OC)cc1N] | 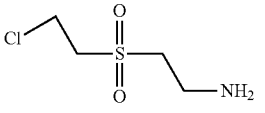 | 30 | Violet |
| 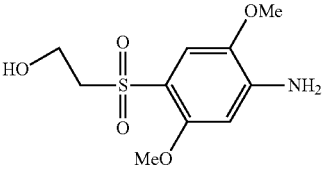 [SMILES: COc1cc(S(=O)(=O)CCO)c(OC)cc1N] | 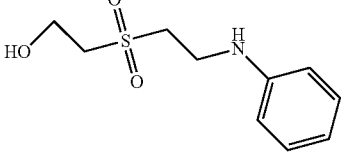 | 31 | Violet |
| 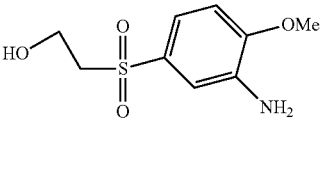 [SMILES: COc1ccc(S(=O)(=O)CCO)cc1N] | 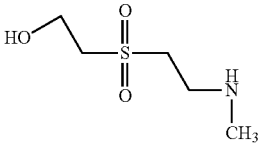 | 32 | Violet |
| 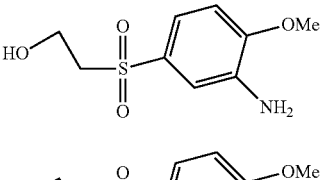 | 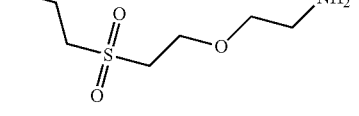 | 33 | Violet |
| 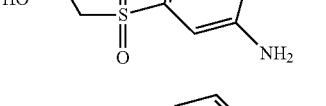 | 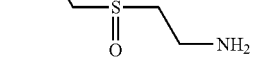 | 34 | Violet |
| 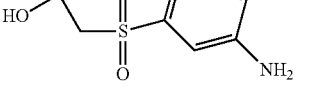 | 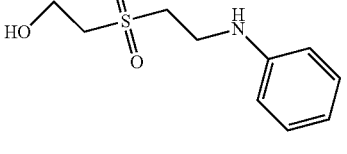 | 35 | Violet |
| 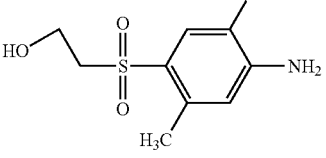 | 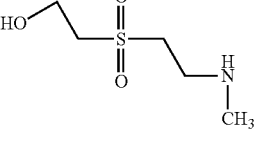 | 36 | Violet |
| 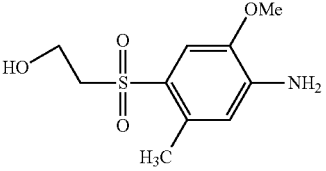 | 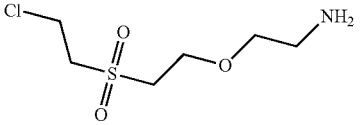 [SMILES: NCCOCCS(=O)(=O)CCCl] | 37 | Violet |
| 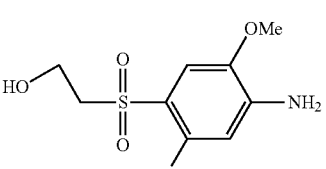 | 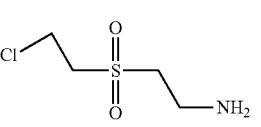 | 38 | Violet |

-continued

| Amine 1 | Amine 2 | Example | Shade on cotton |
|---|---|---|---|
| ![Amine 1 structure: HO-CH2CH2-SO2-phenyl with OMe, CH3, NH2 substituents] | ![Amine 2 structure: HO-CH2CH2-SO2-CH2CH2-NH-phenyl] | 39 | Violet |

Example 40:

1. Condensation: 10.13 parts of dichloro-sulfophenyl-xanthen were mixed together with 4.22 parts of 2-(2-chloro-ethanesulfonyl)-ethylamine as amine 1 in 100 ml of water and the pH was adjusted to 5.0. The reaction mixture was heated to 60° C. and stirred and the pH was kept at 5.0 with a 15% ic $Na_2CO_3$ solution.

2. Condensation: After 1 hour 4.9 parts 2-(2-methyl-amino-ethanesulfonyl)-ethanol as amine 2 were added and the pH was adjusted to 9.0 and the reaction mixture was heated to 90° C. and stirred for 3 hours.

The reaction mix was cooled to room temperature and the water was evaporated under reduced pressure delivering 19.3 parts of Intermediate 1 after drying under vacuum conditions.

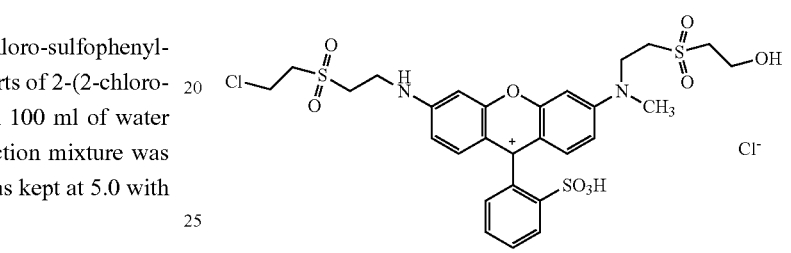

Intermediate 40

Sulfonation: 17.52 parts of Intermediate 1 were added in portions to 110 parts sulfuric acid (98 to 100%) at 20 to 60° C. the reaction mixture was stirred for 3 h at 60° C. and then cooled to 0 to 5° C. This mixture was added to 300 parts of ice at 0° C., the pH was adjusted with $CaCO_3$ to 5.3. The $CaSO_4$ was filtered and the product in the filtrated solution was isolated by vacuum rotary evaporation and dried under vacuum conditions resulting in 16 parts of example 1 that dyes cotton in brilliant fluorescent red shades.

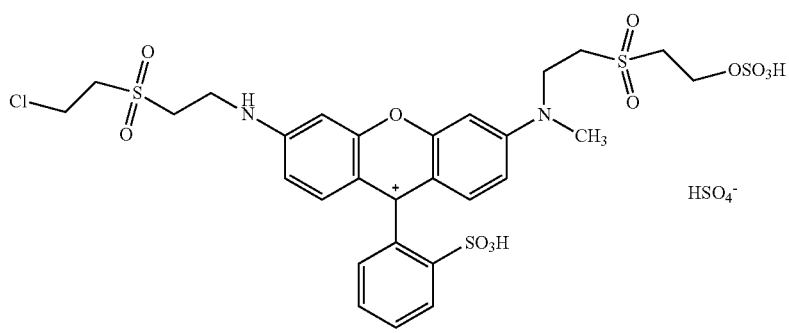

EXAMPLE 40

Example 41 to 43

According to example 40 and example 2 the following amines can be used for 1. Condensation (Amine 1) and for 2. Condensation (Amine 2), after sulfonation and isolation according to example 1 or 2 dyes having the given colours are obtained when using amines 1 and 2 as indicated.

| Amine 1 | Amine 2 | Expl. | Shade on cotton |
|---|---|---|---|
|  | 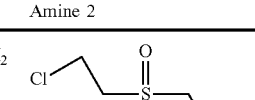 | 41 | Bluish red |
|  | 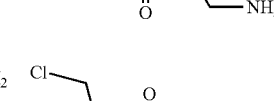 | 42 | Bluish red |
|  | 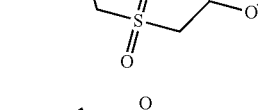 | 43 | Bluish red |

Example 44:

32.2 parts of phthalic anhydride were added to 246 parts of $POCl_3$ under stirring. After 30 minutes 58 parts of Resorcinol (3-Hydroxy-phenol) were added and the mixture was heated to 95° C. and stirred for 2 hours. The reaction mixture was cooled down to 5° C. and added to 3000 parts of a 5° C. cold 20% ic aqueous NaCl solution. The suspension was stirred for 30 minutes at 0 to 5° C. and filtrated. The isolated wet press paste was suspended in 200 parts of acetone and stirred for 20 minutes at 5° C. After filtration and drying 24.6 parts of dichloro-carboxyphenyl-xanthen were isolated.

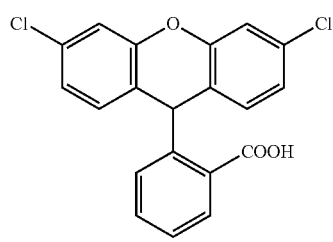

Dichloro-Carboxyphenyl-xanthen

1. Condensation: 9.5 parts of dichloro-carboxyphenyl-xanthen were mixed together with 5.73 parts of n-ethyl-3 (β-hydroyethy)sulfonyl anilin/(2-(3-ethylamino-benzene-sulfonyl)ethanol) in 100 ml of water and the pH was adjusted to 5.0. The reaction mixture was heated to 60° C. and stirred and the pH was kept at 5.0 with a 15% ic $Na_2CO_3$ solution.

2. Condensation: After 1 hour 4.9 parts of 2-(2-methyl-amino-ethanesulfonyl)-ethan were added and the pH was adjusted to 9.0 and the reaction mixture was heated to 90° C. and stirred for 3 hours.

The reaction mix was cooled to room temperature and the water was evaporated under reduced pressure delivering 19.8 parts of Intermediate 1 after drying under vacuum conditions.

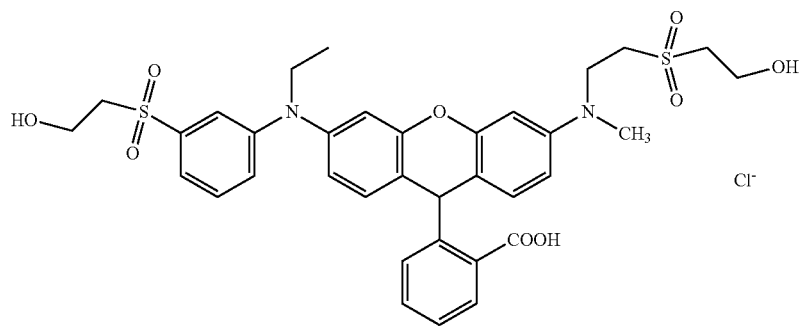

Intermediate 1-carboxy

Sulfonation: 16.1 parts of Intermediate 1 were added in portions to 90 parts sulfuric acid (98 to 100%) at 20 to 60° C. The reaction mixture was stirred for 3 h at 60° C. and then cooled to 0 to 5° C. This mixture was added to 250 parts of ice at 0° C., the pH was adjusted with CaCO₃ to 5.3. The CaSO₄ was filtered and the product in the filtrated solution was isolated by vacuum rotary evaporation and dried under vacuum conditions resulting in 14.9 parts of example 1 that dyes cotton in brilliant fluorescent red shades.

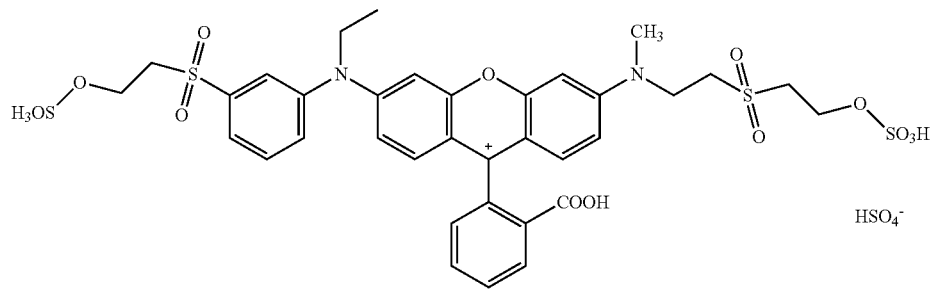

EXAMPLE 44

Examples 45 to 68:

According to example 44 the following amines can be used for the first condensation (Amine 1) and for the second condensation (Amine 2). After sulfonation and isolation according to example 44 dyes having the given colours are obtained when using amines 1 and 2 as indicated.

| Amine 1 | Amine 2 | Expl. | Shade on cotton |
|---|---|---|---|
| | | 45 | Red |
| | | 46 | Red |
| | | 47 | Red |
| | | 48 | Red |
| | | 49 | Red |
| | | 50 | Red |

| Amine 1 | Amine 2 | Expl. | Shade on cotton |
|---|---|---|---|
| HO-CH₂CH₂-SO₂-(3-position on phenyl)-NH-CH₂CH₃ | Cl-CH₂CH₂-SO₂-CH₂CH₂-NH₂ | 51 | Bluish red |
| HO-CH₂CH₂-SO₂-(3-position on phenyl)-NH-CH₂CH₃ | Cl-CH₂CH₂-SO₂-CH₂CH₂-O-CH₂CH₂-NH₂ | 52 | Bluish red |
| HO-CH₂CH₂-SO₂-(3-position on phenyl)-NH-CH₂CH₃ | HO-CH₂CH₂-SO₂-CH₂CH₂-NH-phenyl | 53 | Bluish red |
| HO-CH₂CH₂-SO₂-CH₂CH₂-NH-CH₃ | Cl-CH₂CH₂-SO₂-CH₂CH₂-O-CH₂CH₂-NH₂ | 54 | Bluish red |
| HO-CH₂CH₂-SO₂-CH₂CH₂-NH-CH₃ | Cl-CH₂CH₂-SO₂-CH₂CH₂-NH₂ | 55 | Bluish red |
| HO-CH₂CH₂-SO₂-CH₂CH₂-NH-phenyl | HO-CH₂CH₂-SO₂-CH₂CH₂-NH-CH₃ | 56 | Bluish red |
| HO-CH₂CH₂-SO₂-CH₂CH₂-NH-phenyl | Cl-CH₂CH₂-SO₂-CH₂CH₂-O-CH₂CH₂-NH₂ | 57 | Bluish red |
| HO-CH₂CH₂-SO₂-CH₂CH₂-NH-phenyl | Cl-CH₂CH₂-SO₂-CH₂CH₂-NH₂ | 58 | Bluish red |
| HO-CH₂CH₂-SO₂-phenyl(SO₃H)(NH₂) | HO-CH₂CH₂-SO₂-CH₂CH₂-NH-CH₃ | 59 | Red |

-continued

| Amine 1 | Amine 2 | Expl. | Shade on cotton |
|---|---|---|---|
| 2-aminophenol-4-(β-hydroxyethylsulfone)-6-sulfonic acid | 2-(2-chloroethylsulfonyl)ethoxyethylamine | 60 | Red |
| 2-aminophenol-4-(β-hydroxyethylsulfone)-6-sulfonic acid | 2-(2-chloroethylsulfonyl)ethylamine | 61 | Red |
| 2-aminophenol-4-(β-hydroxyethylsulfone)-6-sulfonic acid | N-phenyl-2-(β-hydroxyethylsulfonyl)ethylamine | 62 | Red |
| 2,5-dimethoxy-4-(β-hydroxyethylsulfonyl)aniline | N-methyl-2-(β-hydroxyethylsulfonyl)ethylamine | 63 | Violet |
| 4-methoxy-3-(β-hydroxyethylsulfonyl)aniline | N-methyl-2-(β-hydroxyethylsulfonyl)ethylamine | 64 | Violet |
| 5-methoxy-2-methyl-4-(β-hydroxyethylsulfonyl)aniline | N-methyl-2-(β-hydroxyethylsulfonyl)ethylamine | 65 | Violet |
| 2-(2-chloroethylsulfonyl)ethoxyethylamine | 2-(2-chloroethylsulfonyl)ethylamine | 66 | Bluish red |
| 2-(2-chloroethylsulfonyl)ethoxyethylamine | 2-(2-chloroethylsulfonyl)ethoxyethylamine | 67 | Bluish red |
| 2-(2-chloroethylsulfonyl)ethylamine | 2-(2-chloroethylsulfonyl)ethylamine | 68 | Bluish red |

Dyeing Example 1:

3 parts of the dye from example 1 of this invention and 60 parts of sodium chloride were dissolved in 1000 parts of water and 12 parts of sodium carbonate and 0.5 parts of a wetting agent were added. This dyebath was entered with 100 parts of bleached cotton knitted fabric. The temperature of the dye bath was raised to 30° C. at a gradient of 0.5° C./minute and held at this temperature for 30 minutes and then increased over 30 minutes to 60° C., this temperature being maintained for a further 60 minutes. Thereafter the dyed goods were initially rinsed with tapwater for 5 minutes. The dyed goods were neutralized at 50° C. using 60% strength acetic acid for 30 to 40 minutes. The goods were rinsed with boiling tapwater for 30 to 40 minutes followed by a final rinse at 40 to 50° C. for 20 minutes and dried.

The very brilliant fluorescent bluish red dyeing obtained has good overall fastness properties.

The invention claimed is:

1. A dye of formula (I)

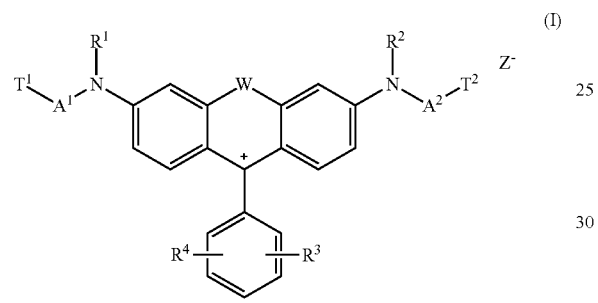
(I)

wherein in each case independent from each other

W is O, S or NH, $R^1$ and $R^2$ is hydrogen, alkyl, alkyl substituted by one or more substituents selected from the group consisting of methoxy, hydroxy, sulfato, sulfo and chloro, aryl, aryl substituted by one or more substituents selected from the group consisting of chloro, acetylamino, sulfo, hydroxy, carboxy, $(C_1-C_4)$-alkanoyl, $(C_1-C_4)$-alkoxy and $(C_1-C_4)$-alkyl or benzyl, $R^3$ and $R^4$ is hydrogen, alkyl, hydroxy, aryl, cycloalkyl, alkoxy, thioalkoxy, N-acylamino, N-cinnamoylamino, halogen, cyano, $SO_3M$, COOM, nitro, acyl, thioacyl, alkylsulfonyl, aryloyl, trifluoromethyl, heteroaryl, heterocycloalkyl, alkoxycarbonyl, alkoxythiocarbonyl, acyloxy, aryloyloxy or $SO_2$—X, wherein X is vinyl or $CH_2CH_2$—Y, wherein Y is a group removable under alkaline conditions, $Z^-$ is selected from the group consisting of halogen, sulfate, alkylsulfonate, benzolsulfonate, toluolsulfonate, tetraborofluorate and acetate, $A^1$ and $A^2$ is a spacer of formula (2d)

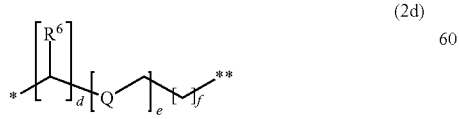
(2d)

whereby the respective spacer $A^1/A^2$ is attached to the chromophore at the * position and to the respective reactive anchor $T^1/T^2$ at the ** position, and wherein d is an integer from 1 to 4, e is an integer from 0 to 3, f is an integer from 0 to 3, Q is O, NH or S, $R^6$ is hydrogen, halogen, alkyl, N-acylamino, alkoxy, thioalkoxy, hydroxy, alkoxycarbonyl, acyl, arylol, acyloxy, aryloyloxy, cycloalkyl, aryl, $SO_3M$ or COOM, $T^1$ and $T^2$ is a reactive anchor of formula (3d), (3e) or $SO_2$—X

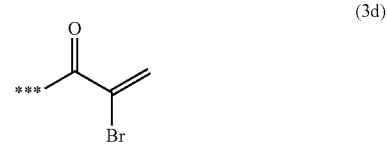
(3d)

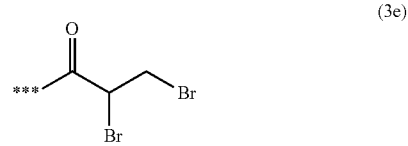
(3e)

whereby the respective reactive anchor $T^1/T^2$ is attached to the respective spacer $A^1/A^2$ at the *** position, and wherein X is vinyl or $CH_2CH_2$—Y, wherein Y is a group removable under alkaline conditions, and M is hydrogen, lithium, sodium, potassium, ammonium, mono-, di-, tri- or tetra-$(C_1-C_4)$-alkylammonium, one equivalent of an alkali earth metal or a monovalent organic cation.

2. The dye according to claim 1, wherein in each case independent from each other W is O or S, $R^1$ and $R^2$ is hydrogen, alkyl, alkyl substituted by one or more substituents selected from the group consisting of methoxy, hydroxy, sulfato, sulfo and chloro, aryl, aryl substituted by one or more substituents selected from the group consisting of chloro, acetylamino, sulfo, hydroxy, carboxy, $(C_1-C_2)$-alkanoyl, $(C_1-C_2)$-alkoxy and $(C_1-C_2)$-alkyl or benzyl, $R^3$ and $R^4$ is hydrogen, $(C_1-C_4)$-alkyl, hydroxy, aryl, $(C_1-C_4)$-alkoxy, N-acylamino, halogen, $SO_3M$, COOM, acyl, $(C_1-C_4)$-alkylsulfonyl, $(C_1-C_4)$-alkoxycarbonyl or $SO_2$—X, wherein X is vinyl or $CH_2CH_2$—Y, wherein Y is a group removable under alkaline conditions, $Z^-$ is selected from the group consisting of halogen, sulfate, alkylsulfonate, benzolsulfonate, toluolsulfonate, tetraborofluorate and acetate, $A^1$ and $A^2$ is a spacer of formula (2d)

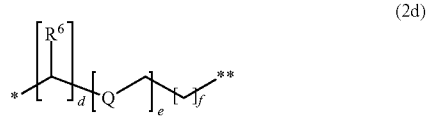
(2d)

whereby the respective spacer $A^1/A^2$ is attached to the chromophore at the * position and to the respective reactive anchor $T^1/T^2$ at the ** position, and wherein d is 1 or 2,
e is 0 or 1,
f is 0,
Q is O or S,
$R^6$ is hydrogen, $(C_1-C_4)$-alkyl, N-acylamino, $(C_1-C_4)$-alkoxy, acyl, benzyl, $SO_3M$ or COOM,
$T^1$ and $T^2$ is $SO_2$—X,
   wherein X is vinyl or $CH_2CH_2$—Y,
      wherein Y is a group removable under alkaline conditions
and
M is hydrogen, lithium, sodium, potassium, one equivalent of an alkali earth metal or a monovalent organic cation.

3. The dye according to claim 1 wherein in each case independent from each other
W is oxygen,
$R^1$ and $R^2$ is hydrogen, $(C_1-C_4)$-alkyl, aryl, or benzyl,
$R^3$ and $R^4$ is hydrogen, $(C_1-C_2)$-alkyl, halogen, $SO_3M$, COOM or $SO_2$—X,
   wherein X is vinyl or $CH_2CH_2$—Y,
      wherein Y is a group removable under alkaline conditions,
$Z^-$ is selected from the group consisting of halogen, sulfate, alkylsulfonate, benzolsulfonate, toluolsulfonate, tetraborofluorate and acetate,
$A^1$ and $A^2$ is a spacer of formula (2d-1)

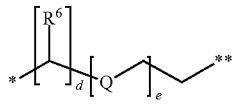

(2d-1)

whereby the respective spacer $A^1/A^2$ is attached to the chromophore at the * position and to the respective reactive anchor $T^1/T^2$ at the ** position, and wherein
d is 1 or 2,
e is 0 or 1,
Q is oxygen,
$R^6$ is hydrogen or $(C_1-C_2)$-alkyl,
$T^1$ and $T^2$ is $SO_2$—X,
   wherein X is vinyl or $CH_2CH_2$—Y,
      wherein Y is a group removable under alkaline conditions
and
M is hydrogen, lithium, sodium, potassium, one equivalent of an alkali earth metal or a monovalent organic cation.

4. The dye according to claim 1, wherein e is 1.
5. The dye according to claim 4, wherein Q is S.
6. The dye according to claim 3, wherein e is 1.
7. The dye according to claim 6, wherein Q is S.
8. The dye according to claim 5, wherein $R^6$ is $(C_1-C_2)$-alkyl.
9. A process for the production of dyes according to claim 1 comprising the steps of:
   a) Reacting one 3,6,9 substituted 9H-Xanthene, wherein the 3- and 6-substituents react as a leaving group, with two precursor-amines H—$NR^1$-$A^1$-$T^1$ and H—$NR^2$-$A^2$-$T^2$ of identical or different spacer-reactive-anchor-units on 3- and 6-position, and
   b) Sulfonating the OH-groups with concentrated sulfuric acid.
10. The process for the production of dyes according to claim 1 comprising the steps of:
   reacting
   one 3,6,9 substituted 9H-Xanthene, wherein the 3- and 6-substituents react as a leaving group, with
      a) two identical aliphatic-, aromatic- or mixed aliphatic/aromatic-amines symmetrically on both 3- and 6-position,
      or
      b) one aliphatic-, aromatic- or mixed aliphatic/aromatic-amine for the 3-position in a first step
      and
      one aliphatic-, aromatic- or mixed aliphatic/aromatic-amine, which is different to the first one, for the 6-position in a second step
      or
      c) one aliphatic-, aromatic- or mixed aliphatic/aromatic-amine for the 6-position in a first step
      and
      one aliphatic-, aromatic- or mixed aliphatic/aromatic-amine, which is different to the first one, for the 3-position in a second step
   and further reacting the products resulting from a), b) and c) respectively with reactive anchor groups.
11. A chemical composition comprising one or more dye(s) according to claim 1.
12. An aqueous solution for dyeing comprising one or more chemical compounds according to claim 1.
13. A process for dyeing or printing carboxamido- and/or hydroxyl-containing material, comprising contacting the carboxamido- and/or hydroxyl-containing material with the dye according to claim 1.
14. An ink digital textile printing, comprising the dye according to claim 1.
15. A process for dyeing fibers which comprises contacting the fibre or blends of the fibres with the dye according to claim 1 wherein the fibres are selected from the group consisting of: synthetic fiber materials, nylon materials, nylon-6, nylon-6.6 and aramid fibres, vegetable fibres, seed fibres, cotton, organic cotton, kapok, coir from coconut husk; bast fibers, flax, hemp, jute, kenaf, ramie, rattan; leaf fibres, sisal, henequen, banana; stalk fibres, bamboo; fibres from animals, wool, organic wool, silk, cashmere wool, alpaca fiber, mohair, Angora fibre, fur and leather materials; manufactured, regenerated and recycled fibres, cellulosic fibres; paper fibres, cellulosic regenerated fibres, viscose rayon fibres, acetate and triacetate fibers and Lyocell fibers.
16. Fiber and blends containing such fiber selected from the group consisting of: synthetic fiber materials, nylon materials, nylon-6, nylon-6.6 and aramid fibres, vegetable fibres, seed fibres, cotton, organic cotton, kapok, coir from coconut husk; bast fibers, flax, hemp, jute, kenaf, ramie, rattan; leaf fibres, sisal, henequen, banana; stalk fibres, bamboo; fibres from animals, wool, organic wool, silk, cashmere wool, alpaca fiber, mohair, Angora fibre, fur and leather materials; manufactured, regenerated and recycled fibres, cellulosic fibres; paper fibres, cellulosic regenerated fibres, viscose rayon fibres, acetate and triacetate fibers, and Lyocell fibers comprising one or more dye(s) according to claim 1 either in chemically and/or physically bound form.
17. A process for dyeing fibers which comprises contacting the fibre or blends of the fibres with the chemical composition according to claim 11 wherein the fibres are selected from the group consisting of: synthetic fiber materials, nylon materials, nylon-6, nylon-6.6 and aramid fibres, vegetable fibres, seed fibres, cotton, organic cotton, kapok, coir from coconut husk; bast fibers, flax, hemp, jute, kenaf, ramie, rattan; leaf fibres, sisal, henequen, banana; stalk fibres, bamboo; fibres from animals, wool, organic wool, silk, cashmere wool, alpaca fiber, mohair, Angora fibre, fur and leather materials; manufactured, regenerated and recycled fibres, cellulosic fibres; paper fibres, cellulosic regenerated fibres, viscose rayon fibres, acetate and triacetate fibers and Lyocell fibers.

18. A process for dyeing fibers which comprises contacting the fibre or blends of the fibres with the aqueous solution according to claim 12 wherein the fibres are selected from the group consisting of: synthetic fiber materials, nylon materials, nylon-6, nylon-6.6 and aramid fibres, vegetable fibres, seed fibres, cotton, organic cotton, kapok, coir from coconut husk; bast fibers, flax, hemp, jute, kenaf, ramie, rattan; leaf fibres, sisal, henequen, banana; stalk fibres, bamboo; fibres from animals, wool, organic wool, silk, cashmere wool, alpaca fiber, mohair, Angora fibre, fur and leather materials; manufactured, regenerated and recycled fibres, cellulosic fibres; paper fibres, cellulosic regenerated fibres, viscose rayon fibres, acetate and triacetate fibers and Lyocell fibers.

* * * * *